US012720143B2

(12) United States Patent
Soh et al.

(10) Patent No.: US 12,720,143 B2
(45) **Date of Patent: *Aug. 25, 2026**

(54) PRIVATE LISTENING SYSTEM FOR STREAMING AUDIO AND VIDEO

(71) Applicant: ROKU, INC., San Jose, CA (US)

(72) Inventors: Andrew Soh, Austin, TX (US); Mikkel Jensen, San Jose, CA (US); Neena Mohanachandran Sailaja, San Jose, CA (US); Jeffery John Peters, Scotts Valley, CA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/948,954

(22) Filed: Nov. 15, 2024

(65) Prior Publication Data

US 2025/0071367 A1 Feb. 27, 2025

Related U.S. Application Data

(63) Continuation of application No. 17/980,292, filed on Nov. 3, 2022, now Pat. No. 12,192,560.

(51) Int. Cl.
*H04N 21/43* (2011.01)
*H04N 21/81* (2011.01)

(52) U.S. Cl.
CPC ... *H04N 21/43072* (2020.08); *H04N 21/8106* (2013.01)

(58) Field of Classification Search
CPC ..................... H04N 21/43072; H04N 21/8106
See application file for complete search history.

(56) References Cited

U.S. PATENT DOCUMENTS 11,196,899 B1 12/2021 Candelore et al.
2015/0067726 A1* 3/2015 Glasser ................ H04L 65/765 725/32

(Continued)

FOREIGN PATENT DOCUMENTS

KR 1020190101373 A 8/2019
KR 1020220101726 A 7/2022

(Continued)

OTHER PUBLICATIONS

International Search Report and Written Opinion of the International Searching Authority directed to related International Patent Application No. PCT/US2023/077906, mailed Feb. 8, 2024; 7 pages.

(Continued)

*Primary Examiner* — Mishawn N. Hunter
(74) *Attorney, Agent, or Firm* — Sterne, Kessler, Goldstein & Fox P.L.L.C.

(57) ABSTRACT

Disclosed herein are various embodiments, for a private listening system for streaming audio and video. An example embodiment operates by receiving a first selection of a first version of audio content for output to a first audio device connected to a streaming media device. A second selection of a second version of the audio content for output to a second audio device connected to the streaming media device is received. Both the first version of the audio content is provided to the first audio device and the second version of the audio content is provided to the second audio device for simultaneous and synchronized output with the video content output to the video device.

20 Claims, 5 Drawing Sheets

(56) References Cited

U.S. PATENT DOCUMENTS

| | | | |
|---|---|---|---|
| 2019/0387320 | A1 | 12/2019 | Sakai |
| 2020/0382569 | A1 | 12/2020 | Fornshell et al. |
| 2022/0201369 | A1 | 6/2022 | Mcclendon |
| 2024/0155178 | A1 | 5/2024 | Soh et al. |

FOREIGN PATENT DOCUMENTS

| | | | |
|---|---|---|---|
| WO | WO 2021/257838 | A1 | 12/2021 |
| WO | WO 2022/043916 | A1 | 3/2022 |

OTHER PUBLICATIONS

U.S. Appl. No. 17/862,273 titled "Automatic Parental Control Using a Remote Control or Mobile App", to Soh et. al., filed Jul. 11, 2022.

* cited by examiner

PRIVATE LISTENING SYSTEM FOR STREAMING AUDIO AND VIDEO

CROSS-REFERENCE TO RELATED APPLICATIONS

This application is a continuation of U.S. patent application Ser. No. 17/980,292, titled "Private Listening System For Streaming Audio And Video", filed Nov. 3, 2022, which is incorporated herein by reference in its entirety.

BACKGROUND

One of the challenges with watching multimedia content on a shared device, such as a television, is that different users who may want to share the viewing experience, may have different audio preferences. However, with conventional setups, all the users who want to share a viewing experience also have to decide upon and share the same audio experience. This can cause a degradation of the experience for everyone, particularly those users who have to share in a sub-optimal audio experience when their preferences may vary from the group's audio preferences or the audio preferences of others.

SUMMARY

Provided herein are system, apparatus, article of manufacture, method and/or computer program product embodiments, and/or combinations and sub-combinations thereof, for a private listening system for streaming audio and video.

An example embodiment operates by determining video content that is being output to a video device. It is determined that a first audio device and a second audio device are both connected to a streaming media device configured to output the audio content. A first selection of the first version for output to the first audio device is received. A second selection of the second version for output to the second audio device is received. Both the first version of the audio content is provided to the first audio device and the second version of the audio content is provided to the second audio device for simultaneous output and coordination with the video content output to the video device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a private listening system for streaming audio and video.

Figure 1:
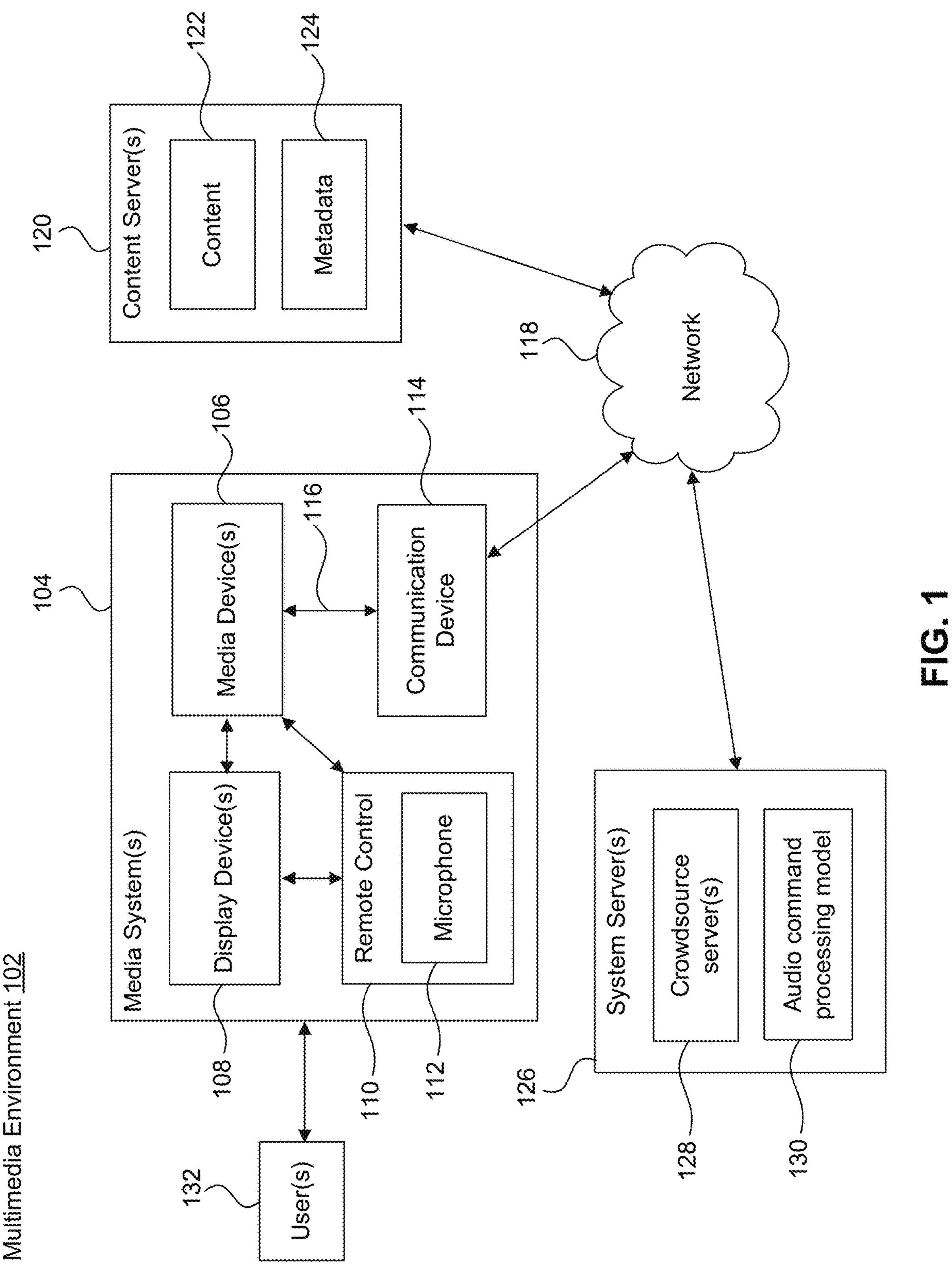
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as Wi-Fi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of user 132. The audio command processing module 130 may then forward the verbal command back to the media device 106 for processing.

Figure 2:
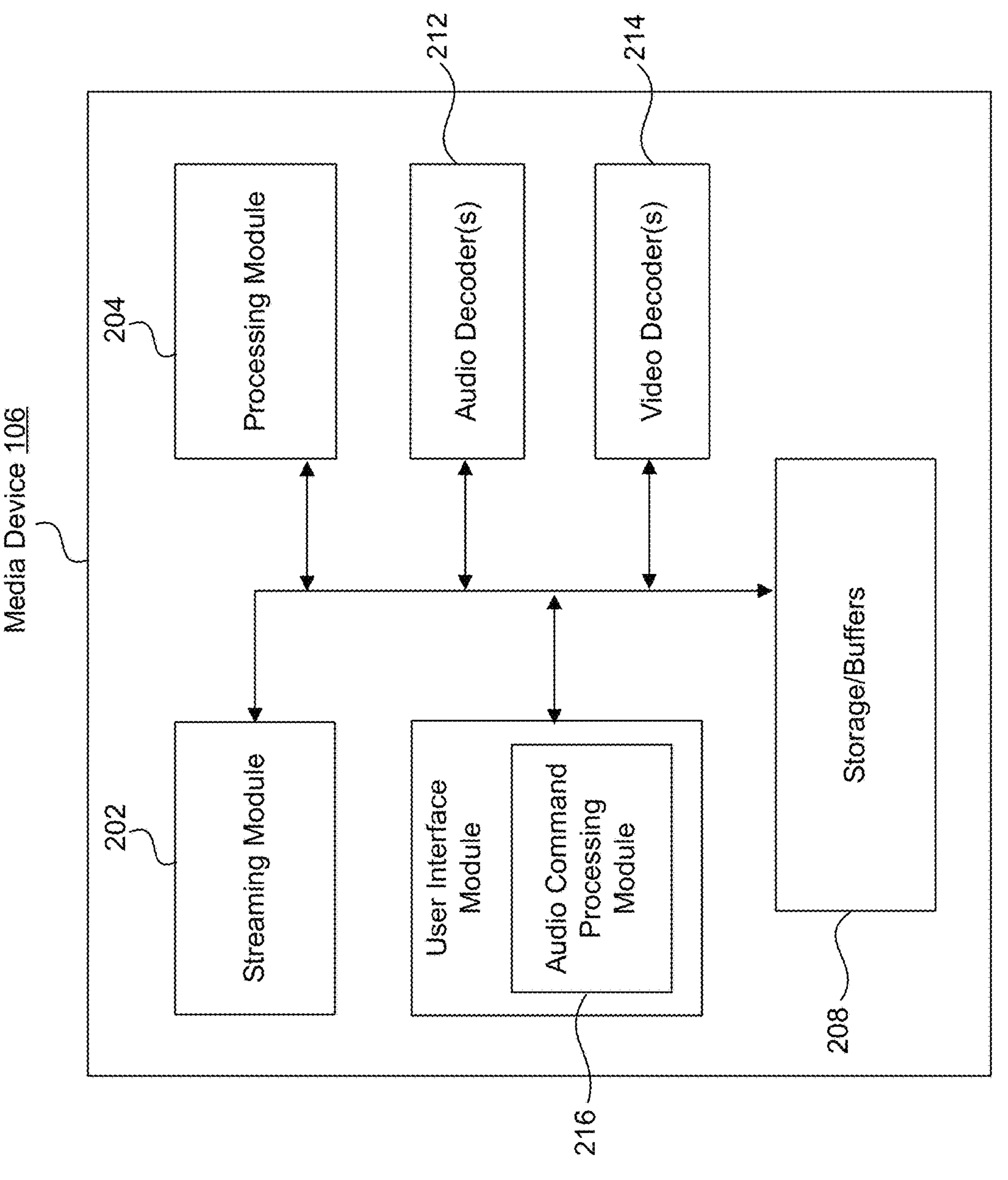
FIG. 2 illustrates a block diagram of an example media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Private Listening System

One of the challenges with watching multimedia content on a shared device, such as a television, is that different users who may want to share the viewing experience may have different audio preferences. However, with conventional setups, all the users who want to share a viewing experience also have to decide upon and share the same audio experience. This can cause a degradation of the experience for everyone, particularly those users who have to share in a sub-optimal audio experience when their preferences may vary from the group's audio preferences or the audio preferences of others.

Figure 3:
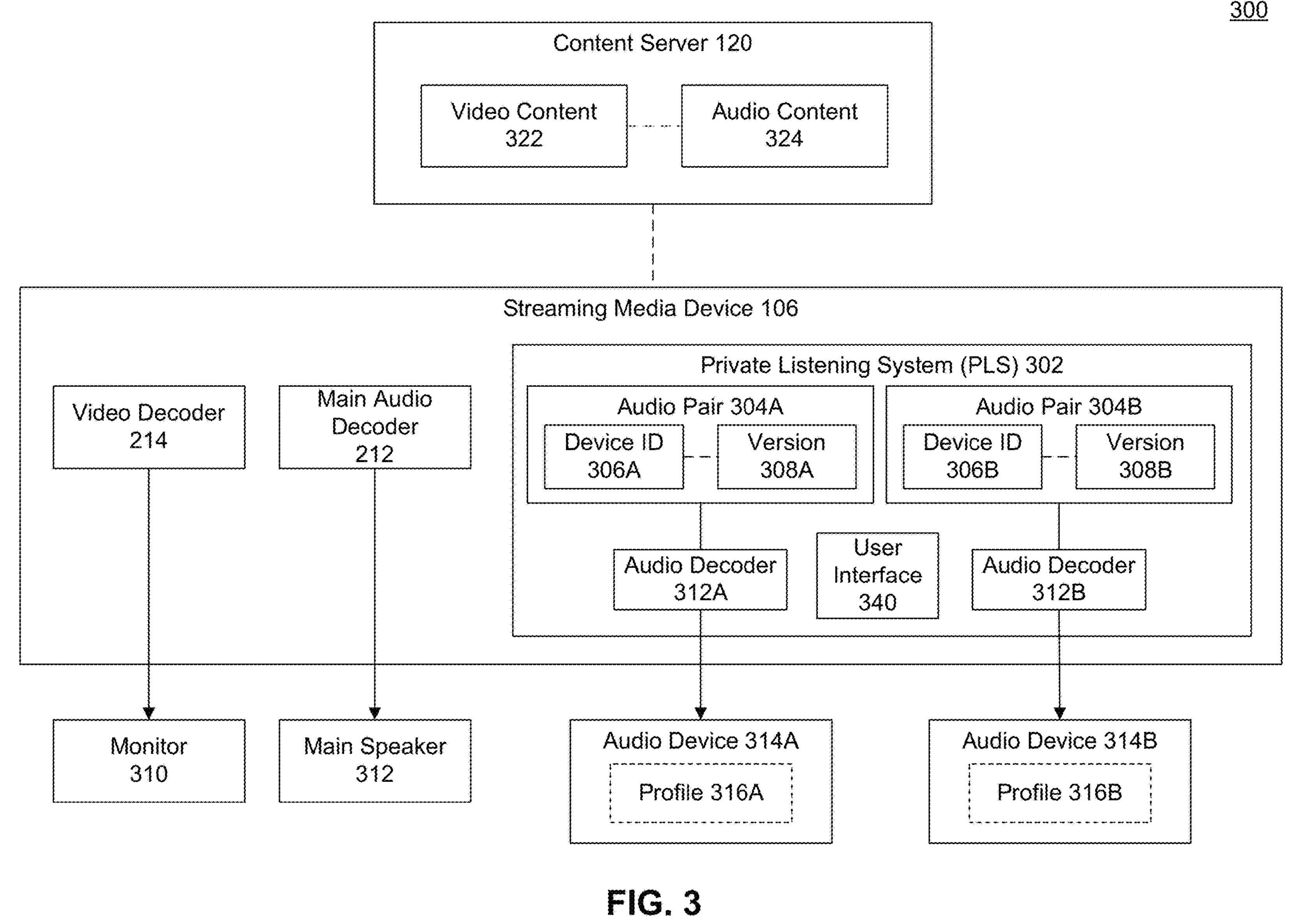
FIG. 3 is a block diagram illustrating a private listening system (PLS), according to some example embodiments.

FIG. 3 is a block diagram 300 illustrating a private listening system (PLS) 302, according to some example embodiments. PLS 302 may enable different users to enjoy unique and customizable audio experiences while sharing a viewing experience or screen. For example, a group of different users may be watching the same television show on monitor 310 (which may include devices such as a laptop, projector, or a television with visual output screens for multimedia), but through PLS 302, each user may have their own unique and individually adjustable audio settings, which may include settings such as language, volume, bass, treble, muting, etc.

PLS 302 may enable multiple, different versions or tracks of audio content 324 to be simultaneously synchronized and output via a variety of different listening devices and coordinated with video content 322 that is being output via monitor 310. For example, main speaker 312 (such as built-in television speakers or a sound bar) may output a default or main audio of the show, movie, or other multimedia that is being played on monitor 310 for various users. However, there may be other users who are also watching the video content 322 on monitor 310 who have unique audio or listening preferences or requirements, different from what is being output via main speaker 312.

While conventionally these users with unique audio preferences would have to listen to the same audio as everyone else through the default speaker system, PLS 302 allows each of these users to uniquely customize their own listening and audio experiences, on their own personal audio devices 314A, 314B while sharing in the same viewing experience on television or monitor 310.

Streaming media device 106 may be a streaming media player, as described above, which receives video content 322 and audio content 324 from a content server 120. In some embodiments, the video content 322 and audio content 324 may be received simultaneously, in real-time. In some embodiments, streaming media device 106 may have a buffer where it can store the received video content 322 and/or audio content 324 prior to output.

In some embodiments, streaming media player 106 may be connected to a monitor 310, such as a television, and main speaker 312, such as a sound bar through wired or wireless connections. In some embodiments, streaming media device 106, monitor 310, and main speaker 312 may all be coupled into one device or system, such as a SMART television or other Internet of Things (IoT) device.

In some embodiments, streaming media device 106 may provide the video content 322 to a video decoder 214, and the audio content 324 to a main audio decoder 212 for output. In some embodiments, streaming media device 106 may perform synchronization such that video content output via monitor 310 is synchronized with audio content 324 output via main speaker 312 and any other connected audio devices 314A, 314B.

Streaming media device 106 may be wired or wirelessly connected to PLS 302. In some embodiments, PLS 302 functionality may be integrated within or as part of a physical streaming media device 106 (that may be located in physical proximity to main speaker 312, and audio devices 314A, 314B or connected over the same wired network connection, Wi-Fi network or over Bluetooth). In some embodiments, PLS 302 functionality may be performed, at least in part, across one or more cloud computing devices which may be communicatively coupled to streaming media device 106 and/or one or more of the audio devices 314A, 314B over a network. In some embodiments, the cloud computing devices may provide either the version 308A to audio device 314A and/or the version 308B to audio device 314B in behalf of and/or in lieu of streaming media device 106 providing the versions 308A, 308B.

PLS 302 may enable different users to select, customize, and receive different versions or tracks of audio content 324 on their individual audio devices 314A, 314B (collectively referred to herein as audio device 314). Audio device 314 may include any device with audio output capabilities, including but not limited to a mobile phone, remote control, hearing aid, one or more speakers, headphones, subwoofer, tablet computer, laptop computer, or an IoT device. Audio device 314 may include a wired or wireless channel or connection to PLS 302, such as WI-FI, Bluetooth, or cellular.

PLS 302 may allow each user of an audio device 314 to customize their own individual audio preferences, which may include selecting which audio track or version of audio content 324 to play and the audio characteristics of the selected version (e.g., bass, treble, balance, volume). PLS 302 may receive and/or store these preferences as an audio pair 304A, 304B (referred to generally as audio pair 304).

In some embodiments, an audio pair 304 may include a device identifier 306A, 306B and a version 308A, 308B (and any user-specified audio characteristics). Device ID 306 may refer to one of the connected audio devices 314A, 314B. Version 308 may identify a selected track or version of audio content 324 to output to the corresponding device ID 306. In some embodiments, version 308 may also indicate the customized audio characteristics for the selected audio (e.g., volume, bass, treble, balance, etc.).

In some embodiments, audio content 324 may include different versions of audio or different audio tracks for the video content 322. The different versions of audio may include different sound characteristics, languages, words, music, sound effects, or other variations. Some examples of different audio tracks may include audio in English, Spanish, an audio description track for the hearing impaired, an audio track with director commentary, an audio track with increased phonics for use with a hearing aid or other audio devices, and a child-friendly audio track in which certain adult-words are replaced, muted, or removed.

In some embodiments, PLS 320 may receive a selection of a version 308A, 308B of which audio track from audio content 324 is to be output to each of the audio devices 314A, 314B, and submit a corresponding request to content server 120. In some embodiments, content server 120 may package the selected audio tracks or versions together as audio content 324 which may be transmitted together to streaming media device 106. Then, for example, streaming media device 106 and/or PLS 302 may use the audio decoders (212, 312A, 312B) to decode the selected audio track for output to each corresponding audio output device (312, 314A, 314B). In some embodiments, each audio decoder may output a different (user-selected or default) audio track from audio content 324.

As described above, streaming media device 106 and/or PLS 302 may maintain or provide synchronization between all of the output audio versions or tracks, and the video content 322 being output via monitor 310. This may allow different individuals to simultaneously enjoy the visual experience of sharing video content 322 while also enjoying and experiencing different audio tracks for the video content 322.

At any point in time, the user of an audio device 314 may change their selection of which audio track they want to listen to (e.g., they may change language from English to Hindi), and PLS 302 may transmit this request to content server 120 which may begin streaming Hindi audio packets as part of audio content 324 (if not already being received as part of audio content 324). In some embodiments, PLS 302 may already have access to the Hindi audio track, and may provide this to the requesting device while the audio being output to the remaining audio devices remains unchanged.

In some embodiments, these changes to the selected audio tracks may be performed directly from audio device 314A (such as a mobile phone) and other users may be unaware of the audio changes or which audio tracks were selected by the user of audio device 314A. In some embodiments, the user of audio device 314A may mute their audio, while the audio content 324 continues to be audibly output via main speaker 312 and audio device 314B.

In some embodiments, different users or audio devices 314 may be associated with different audio preferences, which may be stored as profiles 316A, 316B (referred to generally as profile 316). Profile 316 may be stored locally on audio device 314, by PLS 302, by streaming media device 106, and/or across one or more cloud computing devices. The profile 316 may include preferences such as preferred language(s) and/or other audio settings or characteristics (e.g., volume, bass, treble, balance, etc.). This is described in greater detail in U.S. patent application Ser. No. 17/862,273 titled "Automatic Parental Control Using A Remote Control Or Mobile App", to Soh et. al., filed on Jul. 11, 2022, which is hereby incorporated by reference in its entirety.

In some embodiments, a user of an audio device 314 may personalize other audio settings or characteristics, such as bass, treble, volume, balance, etc. These may be saved as part of profile 316 or version 308, or may be one-off settings for the current connection to PLS 302, which may be reset to the default settings on the next use or connection. In some embodiments, these audio settings may be adjusted locally on an audio device 314 (if possible), such as through an interface of a mobile phone. In some embodiments, the audio settings may need to be adjusted at the streaming media device 106 and/or PLS 302 through a shared user interface 340 that is displayed on monitor 310. For example, a user of audio device 314B may increase their bass settings of their audio track, while the bass settings of the tracks output via main speaker 312 and audio device 314A are unaffected.

User interface 340 may include any visual interface, which may be displayed via monitor 310, which allows the audio of main speaker 312, audio device 314A, and/or audio device 314B to be adjusted. In some embodiments, user interface 340 may be displayed as an overlay on top of video content 322. In some embodiments, PLS 302 may enable multiple users to simultaneously adjust their audio settings via user interface 340, as user interface 340 may simultaneously display multiple boxes indicating the audio characteristics of each audio output device 312, 314A, 314B which may be connected to a different remote control that is configured to adjust the characteristics.

In some embodiments, a user adjusting their audio selections of a version 308, may cause the video content 322 (and corresponding audio content 324) to pause for every connected audio output device. In other embodiments, the video content 322 may continue playing while the audio versions or settings are being updated by one or more users. Though not illustrated, the version of audio for main audio decoder 212 that is played through main speaker 312 (if any) may be changed and adjusted as described herein with its own audio pair 304 and/or profile 316.

In some embodiments, if all of the audio output devices (312, 316A, 316B) include a selection of the same audio track or same version of audio content 324, then streaming media device 106 or PLS 302 may output a single wireless stream of audio content 324 (e.g., through a single audio decoder), and each audio output device may be configured to listen for the stream (e.g., rather than having its own unique dedicated audio channel). However, if audio device 314A switches to a different audio track or adjusts their audio settings, then different audio channels may be established for each audio output device (as illustrated).

In some embodiments, if one of the audio devices 314A, 314B or channels is detected to become disconnected while video content 322 is streaming, PLS 302 may pause the video output for everyone. A prompt may be displayed on user interface 340 that allows the users to confirm whether the disconnection was intentional before resuming video output. In some embodiments, the video may continue playing as audio devices 314A, 314B connect and/or disconnect to PLS 302 or adjust their audio preferences. In some embodiments, a visual notification indicating which connection was disconnected or terminated may appear on user interface 340 or monitor 310, where the video content 322 is being output.

If the video content 322 has advertisements, in some embodiments, different audio ads may be provided to different audio output devices 312, 314A, 314B based on their selections of which audio tracks to receive. In some embodiments, the video content 322 may include a video for an advertisement and each audio output device may include its corresponding audio track. In some embodiments, a video message may be displayed as part of video content 322, and each audio output device may receive a unique audio advertisement based on which audio track or version of audio content 324 they have selected. For example, the audio advertisement for a French listener may be for a restaurant, while the audio advertisement for an English listener may be for a clothing line.

In some embodiments, one or more remote controls connected to streaming media device 106 may have the ability to affect global changes for all listeners of the different audio output devices 312, 314A, 314B. For example, there may be a global mute option that mutes the audio for all the audio output devices. In some embodiments, these global changes may include the ability to toggle on/off or otherwise restrict or limit the ability of different users to customize their audio preferences as described herein, while video content 322 is being output. For example, the some of the users may be restricted from changing their audio characteristics (volume, bass, treble) but may be able to customize their languages, or vice versa.

Figure 4:
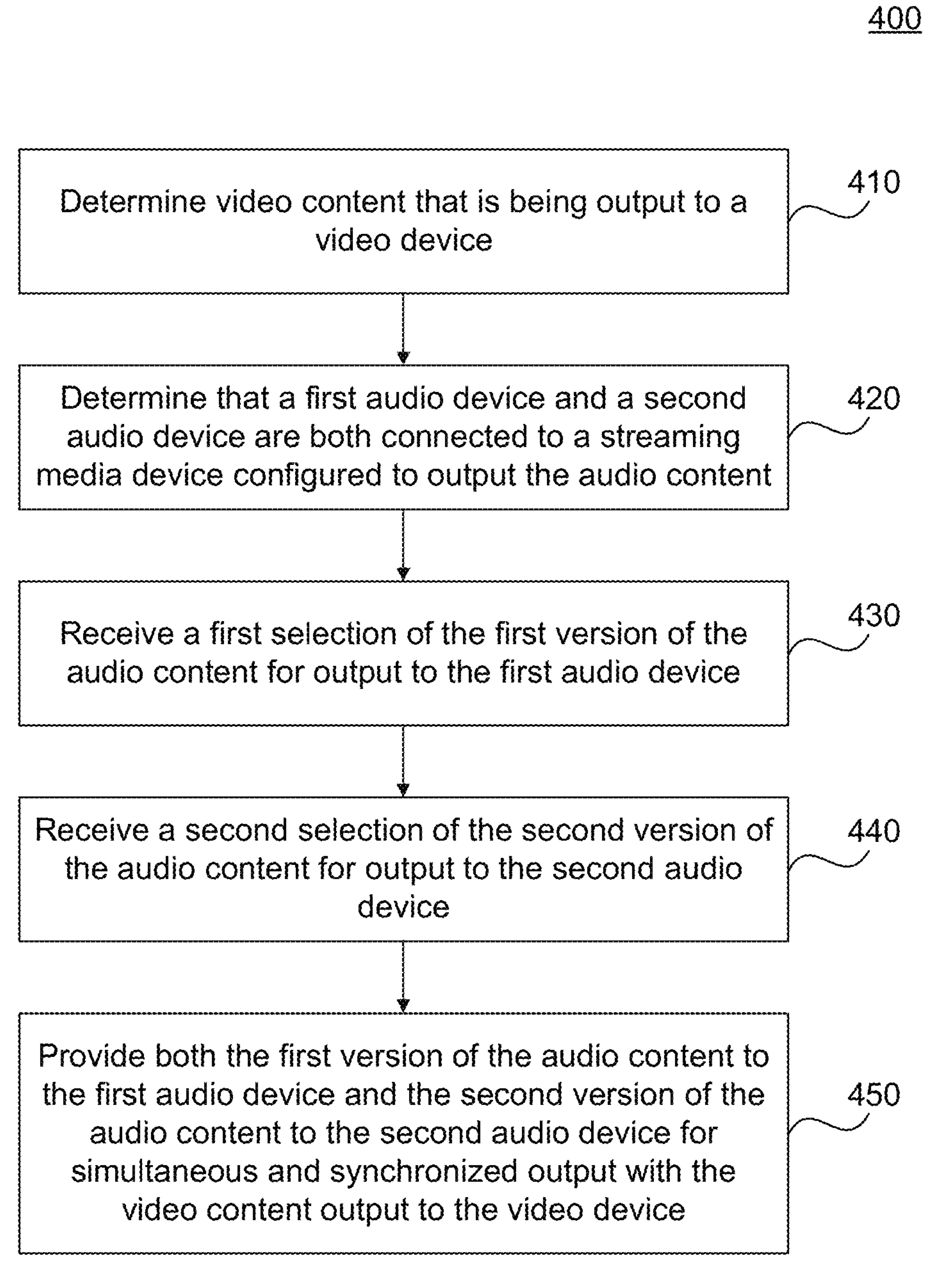
FIG. 4 is a flowchart illustrating example operations for a private listening system (PLS), according to some embodiments.

FIG. 4 is a flowchart 400 illustrated example operations for a private listening system (PLS) 302, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 3. However, method 400 is not limited to that example embodiment. For example, and without limitation, method 400 could also be applied to the example embodiment shown in FIG. 1.

In step 410, it is determined that video content is being output to a video device. For example, PLS 302 may determine or receiving a notification from streaming media device 106 that video content 322 is being output to monitor 310. PLS 302 may have access to audio content 324 through streaming media device 106, directly from content server 120, or may have it stored locally. Audio content 324 may include different audio tracks, such as audio in different languages, kid-friendly audio, and/or audio description audio.

In step 420, it is determined that a first audio device and a second audio device are both connected to a streaming media device configured to output the audio content. For example, streaming media device 106 may detect a connection from audio device 314A and 314B over Wi-Fi or Bluetooth. In some embodiments, the connection may be a wired connection.

In step 430, a first selection of the first version of the audio content for output to the first audio device is received. For example, PLS 302 may receive a selection of a version 308A from audio device 314A, which may be identified by device ID 306A.

In step 440, a second selection of the second version of the audio content for output to the second audio device is received. For example, PLS 302 may receive a selection of a version 308B from audio device 314B, which may be identified by device ID 306B.

In step 450, both the first version of the audio content is provided to the first audio device and the second version of the audio content is provided to the second audio device for simultaneous and synchronized output with the video content output to the video device. For example, PLS 302 may provide a first version or audio track of audio content 324 to audio device 314A and a second version or audio track of audio content 324 to audio device 314B, whereby both audio tracks are synchronized with video content 322 output via monitor 310.

Example Computer System

Figure 5:
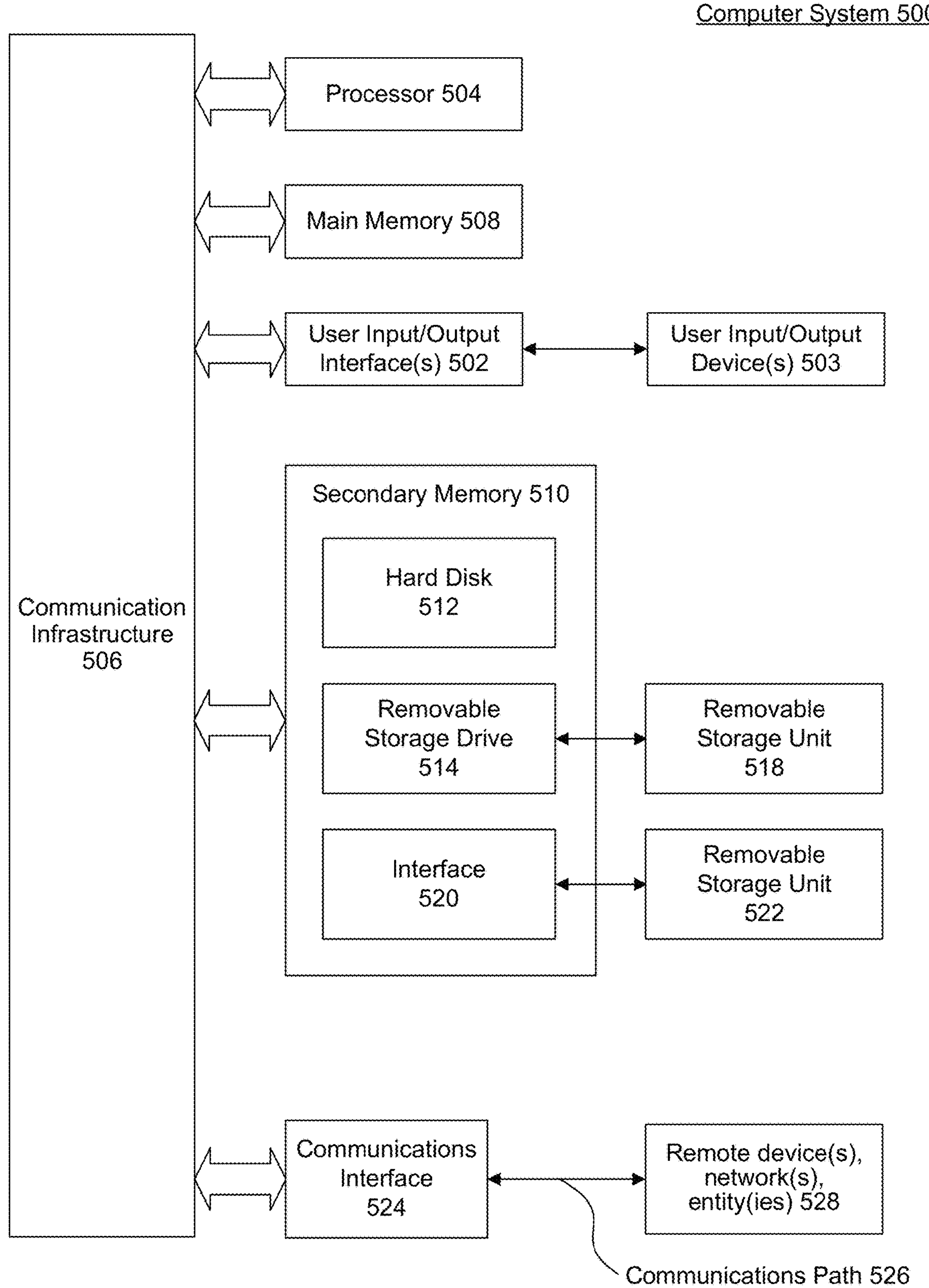
FIG. 5 illustrates an example computer system useful for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

providing, by a network device comprising at least one computer processor, video content, a first version of audio content corresponding to the video content, and a second version of the audio content corresponding to the video content, to a streaming media device for output, wherein the streaming media device is configured to synchronize and simultaneously output the first version of the audio content to a first audio device and the second version of the audio content to a second audio device;

selecting a first advertisement to be output with the first version of the audio content;

selecting a second advertisement to be output with the second version of the audio content; and simultaneously providing, by the network device, both the first advertisement to the first audio device and the second advertisement to the second audio device, in lieu of the network device providing the first advertisement and the second advertisement to the streaming media device.

2. The method of claim 1, further comprising:

receiving an audio stream from a content provider of a video stream, the audio stream including both the first version of the audio content and the second version of the audio content.

3. The method of claim 1, wherein the first version of the audio content comprises the audio content in a first language, and wherein the second version of the audio content comprises the audio content in a second language.

4. The method of claim 1, wherein the first version of the audio content comprises the audio content in a default language, and wherein the second version of the audio content comprises an audio description track of the audio content.

5. The method of claim 1, further comprising:

receiving a customized audio setting for the first version of the audio content;

adjusting the first version of the audio content based on the customized audio setting, wherein the second version of the audio content remains unchanged; and providing the adjusted first version of the audio content to the first audio device.

6. The method of claim 5, wherein the customized audio setting comprises receiving a selection of a new language for the first version of the audio content, wherein the audio content in the new language is provided by the network device to the first audio device.

7. The method of claim 1, wherein the first advertisement is for a different product or service relative to the second advertisement.

8. A network device, comprising at least one processor each coupled to one or more memories and configured to perform operations comprising:

providing, by the network device, video content, a first version of audio content corresponding to the video content, and a second version of the audio content corresponding to the video content, to a streaming media device for output, wherein the streaming media device is configured to synchronize and simultaneously output the first version of the audio content to a first audio device and the second version of the audio content to a second audio device;

selecting a first advertisement to be output with the first version of the audio content;

selecting a second advertisement to be output with the second version of the audio content; and simultaneously providing, by the network device, both the first advertisement to the first audio device and the second advertisement to the second audio device, in lieu of the network device providing the first advertisement and the second advertisement to the streaming media device.

9. The network device of claim 8, the operations further comprising:

receiving an audio stream from a content provider of a video stream, the audio stream including both the first version of the audio content and the second version of the audio content.

10. The network device of claim 8, wherein the first version of the audio content comprises the audio content in a first language, and wherein the second version of the audio content comprises the audio content in a second language.

11. The network device of claim 8, wherein the first version of the audio content comprises the audio content in a default language, and wherein the second version of the audio content comprises an audio description track of the audio content.

12. The network device of claim 8, the operations further comprising:

receiving a customized audio setting for the first version of the audio content;

adjusting the first version of the audio content based on the customized audio setting, wherein the second version of the audio content remains unchanged; and providing the adjusted first version of the audio content to the first audio device.

13. The network device of claim 12, wherein the customized audio setting comprises receiving a selection of a new language for the first version of the audio content, wherein the audio content in the new language is provided by the network device to the first audio device.

14. The network device of claim 8, wherein the first advertisement is for a different product or service relative to the second advertisement.

15. A non-transitory computer-readable medium having instructions stored thereon that, when executed by at least one computing device, cause the at least one computing device to perform operations comprising:

providing, by the at least one computing device, video content, a first version of audio content corresponding to the video content, and a second version of the audio content corresponding to the video content, to a streaming media device for output, wherein the streaming media device is configured to synchronize and simultaneously output the first version of the audio content to a first audio device and the second version of the audio content to a second audio device;

selecting a first advertisement to be output with the first version of the audio content;

selecting a second advertisement to be output with the second version of the audio content; and simultaneously providing, by the at least one computing device, both the first advertisement to the first audio device and the second advertisement to the second audio device, in lieu of a network device providing the first advertisement and the second advertisement to the streaming media device.

16. The non-transitory computer-readable medium of claim 15, the operations further comprising:

receiving an audio stream from a content provider of a video stream, the audio stream including both the first version of the audio content and the second version of the audio content.

17. The non-transitory computer-readable medium of claim 15, wherein the first version of the audio content comprises the audio content in a first language, and wherein the second version of the audio content comprises the audio content in a second language.

18. The non-transitory computer-readable medium of claim 15, wherein the first version of the audio content comprises the audio content in a default language, and wherein the second version of the audio content comprises an audio description track of the audio content.

19. The non-transitory computer-readable medium of claim 15, the operations further comprising:

receiving a customized audio setting for the first version of the audio content;

adjusting the first version of the audio content based on the customized audio setting, wherein the second version of the audio content remains unchanged; and providing the adjusted first version of the audio content to the first audio device.

20. The non-transitory computer-readable medium of claim 19, wherein the customized audio setting comprises receiving a selection of a new language for the first version of the audio content, wherein the audio content in the new language is provided by the at least one computing device to the first audio device.

* * * * *